(12) United States Patent
Allen et al.

(10) Patent No.: US 7,529,016 B1
(45) Date of Patent: May 5, 2009

(54) EXTENDED-RANGE TILTABLE MICROMIRROR

(76) Inventors: James J. Allen, 11808 La Vista Grande NE., Albuquerque, NM (US) 87111; Gloria J. Wiens, 12847 SW. 4th Rd., Newberry, FL (US) 32669; Jessica R. Bronson, 3301 SW. 13th St., Apt. P232, Gainesville, FL (US) 32608

( * ) Notice: Subject to any disclaimer, the term of this patent is extended or adjusted under 35 U.S.C. 154(b) by 173 days.

(21) Appl. No.: 11/494,223

(22) Filed: Jul. 27, 2006

(51) Int. Cl.
*G02B 26/00* (2006.01)
*G02B 26/08* (2006.01)

(52) U.S. Cl. .................. 359/290; 359/291; 359/224
(58) Field of Classification Search ......... 359/223–224, 359/237–238, 290–291
See application file for complete search history.

(56) References Cited

U.S. PATENT DOCUMENTS

| | | | |
|---|---|---|---|
| 6,211,599 B1 * | 4/2001 | Barnes et al. | 310/309 |
| 6,624,548 B1 | 9/2003 | Miller et al. | |
| 6,629,461 B2 | 10/2003 | Behin et al. | |
| 6,707,176 B1 | 3/2004 | Rodgers | |
| 6,744,173 B2 | 6/2004 | Behin et al. | |
| 6,758,983 B2 | 7/2004 | Conant et al. | |
| 6,894,420 B2 | 5/2005 | Rodgers | |
| 7,009,755 B2 | 3/2006 | Fu | |
| 7,071,594 B1 * | 7/2006 | Yan et al. | 310/309 |
| 2003/0025982 A1 * | 2/2003 | Wang et al. | 359/290 |
| 2003/0203530 A1 * | 10/2003 | Lee et al. | 438/72 |
| 2004/0070310 A1 | 4/2004 | Ollier et al. | |
| 2004/0245871 A1 | 12/2004 | Kim et al. | |

OTHER PUBLICATIONS

Ernest J. Garcia, "Pivoting Micromirror Designs for Large Orientation Angles," Proceedings of SPIE vol. 4178, Aug. 2000, pp. 126-136.*
K. Isamoto et al., "Self-assembly Technique for MEMS Vertical Comb Electrostatic Actuator," IEICE Electronics Express, vol. 2, No. 9, May 2005, pp. 311-315.*
D. Piyabongkarn et al "Travel Range Extension of a MEMS Electrostatic Microactuator" IEEE Transactions on Control Systems Technology, vol. 13, No. 1 Jan. 2005, pp. 138-145.
Jessica R. Bronson et al, "Modeling and Alleviating Instability in a MEMS vertical comb drive using a progressive linkage", Proceedings of ASME IDETC/CIE, Sep. 24-28, 2005, Long Beach, CA pp. 1-7.
Edward K. Chan et al, "Electrostatic Micromechanical Actuator with Extended Range of Travel," Journal of Microelectromechanical Systems, vol. 9, No. 3, Sep. 2000, pp. 321-328.

(Continued)

*Primary Examiner*—Jessica T Stultz
*Assistant Examiner*—Mahidere S Sahle
(74) *Attorney, Agent, or Firm*—John P. Hohimer

(57) ABSTRACT

A tiltable micromirror device is disclosed in which a micromirror is suspended by a progressive linkage with an electrostatic actuator (e.g. a vertical comb actuator or a capacitive plate electrostatic actuator) being located beneath the micromirror. The progressive linkage includes a pair of torsion springs which are connected together to operate similar to a four-bar linkage with spring joints. The progressive linkage provides a non-linear spring constant which can allow the micromirror to be tilted at any angle within its range substantially free from any electrostatic instability or hysteretic behavior.

20 Claims, 8 Drawing Sheets

OTHER PUBLICATIONS

Joseph I. Seeger, et al, "Stabilization of Electrostatically Actuated Mechanical Devices," Transducers '97, International Conference on Solid-State Sensors and Actuators, Chicago, Jun. 16-19, 1997, pp. 1133-1136.

David M. Burns et al, "Nonlinear flexures for stable deflection of an electrostatically actuated micromirror," SPIE vol. 3226, 1997, pp. 125-136.

Joseph I. Seeger et al, "Dynamics and control of parallel-plate actuators beyond the electrostatic instability," Transducers '99, The 10th International Conference on Solid-State Sensors and Actuators, Sendai, Japan, Jun. 7-9, 1999, pp. 474-477.

Chris Cortopassi et al, "Nonlinear Springs for Increasing the Maximum Stable Deflection of MEMS Electrostatic Gap Closing Actuators," downloaded Jul. 18, 2006 from robotics.eece.berkeley.edu/~pister/245/project/CortopassiEnglander.pdf.

J. M. Kyynarainen et al, "Increasing the Dynamic Range of a Micromechanical Moving-Plate Capacitor," Analog Integrating Circuits and Signal Processing, vol. 29, pp. 61-70, 2001.

Elmer S. Hung et al, "Extending the Travel Range of Analog-Tuned Electrostatic Actuators," Journal of Microelectromechanical Systems, vol. 8, No. 4, Dec. 1999, pp. 497-505.

Jessica R. Bronson, "Effects of Electrostatic Instability on the Performance of MEMS Actuators," 2005 Florida Conference on Recent Advances in Robotics, Gainesville, FL, May 5-6, 2005, pp. 1-4.

Sang-Joon J. Lee et al, "A Monolithic Micro Four-Bar Mechanism with Flexure Hinges," Proceedings of 2004 ASME IMECE, Nov. 13-20, Anaheim, CA. pp. 1-6.

* cited by examiner

EXTENDED-RANGE TILTABLE MICROMIRROR

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates in general to microelectromechanical systems (MEMS) and in particular to a MEMS tiltable micromirror which includes a non-linear torsion spring (also termed a progressive linkage) that overcomes an electrostatic instability and extends the tilt range of the micromirror.

BACKGROUND OF THE INVENTION

Micromirrors have emerged as key components for optical microelectromechanical systems (MEMS) applications, including switching and scanning operations used, for example, in optical signal routers and projection displays. Such micromirrors are electrostatically tilted using capacitive plate or vertical comb actuators which can be fabricated underneath the micromirror, thereby allowing for arrays having a high fill factor. These electrostatic actuators operate with a voltage applied between a pair of capacitor plates or interdigitated electrostatic combs to produce an electrostatic force of attraction that urges a moveable capacitor plate or electrostatic comb towards a fixed capacitor plate or comb thereby tilting the micromirror.

One limiting factor, however, for these capacitive plate and vertical comb electrostatic actuators is an electrostatic pull-in instability which occurs when the electrostatic force of attraction exceeds a restoring force of a linear torsion spring which has heretofore been used to suspend the micromirror. When pull-in occurs once the applied voltage reaches a pull-in value, the tilted micromirror can no longer maintain an equilibrium position and will abruptly move, or pull in, to its fully actuated position. This behavior can be advantageous in a digital micromirror having only two stable actuation positions (i.e. tilted and untilted). However, for micromirrors which must be continuously and controllably tilted, the pull-in instability severely limits a tilt scan range of the micromirror.

Additionally, once the micromirror has been pulled in to its fully actuated position, the voltage required to maintain that position is less than the pull-in value. As a result, the micromirror will not move from the fully actuated position until the applied voltage has been reduced below the pull-in value. The result is that the tilting movement of the micromirror exhibits an undesirable hysteretic behavior.

The present invention overcomes the limitations of the prior art by providing a progressive linkage which acts as a non-linear spring to substantially alleviate or eliminate the electrostatic pull-in instability and hysteretic behavior of the micromirror, thereby increasing a range of tilt of the micromirror.

These and other advantages of the present invention will become evident to those skilled in the art.

SUMMARY OF THE INVENTION

The present invention relates to a tiltable micromirror apparatus (also termed a tiltable micromirror) which comprises a substrate and a light-reflective platform (also referred to herein as a micromirror). The light-reflective platform is tiltably suspended above the substrate by a first torsion spring which is attached to both the platform and the substrate. A second torsion spring is located alongside of the first torsion spring and connected thereto by a connecting member which is suspended above the substrate by the first and second torsion springs, with the second torsion spring further being attached to the substrate. The first and second springs form what is referred to herein as a progressive linkage. An electrostatic actuator is located below the light-reflective platform and operatively connected to tilt the light-reflective platform in response to an applied voltage, with the first and second torsion springs acting together to provide a non-linear restoring force in opposition to tilting of the light-reflective platform by the electrostatic actuator.

The first and second torsion springs each comprise a plurality of elongate horizontal members (also referred to herein as torsion bars) which are located above the substrate and substantially parallel thereto. One or both of the first and second torsion springs can further comprise a substantially rigid member (also termed a rigid bar) to interconnect each adjacent pair of the plurality of elongate horizontal members therein. The first and second torsion springs in combination with the connecting member and the substrate can also be viewed as forming a four-bar linkage with spring joints.

Each end of the first torsion spring can be attached to the substrate, with one end of the connecting member being attached near a midpoint of the first torsion spring. Each end of the second torsion spring can also be attached to the substrate, with the other end of the connecting member being attached near a midpoint of the second torsion spring. Each torsion spring can comprise a plurality of layers of polycrystalline silicon which are stacked up and interconnected.

In certain embodiments of the present invention, the electrostatic actuator can comprise a capacitive plate actuator having a fixed capacitive plate supported on the substrate and a moveable capacitive plate located on or below the light-reflective platform, with the movable capacitive plate in response to the applied voltage being urged towards the fixed capacitive plate to tilt the light-reflective platform. In other embodiments of the present invention, the electrostatic actuator can comprise a vertical comb actuator which further comprises a plurality of moveable fingers suspended below the light-reflective platform and a plurality of fixed fingers supported on the substrate, with the moveable fingers in response to the applied voltage being urged towards the fixed fingers to tilt the light-reflective platform.

The light-reflective platform can further comprise a mirror coating located on an upper surface thereof. A stop can also be located below the light-reflective platform to limit an angle of tilt of the light-reflective platform.

The present invention also relates to a tiltable micromirror apparatus which comprises a substrate; a micromirror suspended above the substrate and tiltable at an angle to the substrate by an electrostatic actuator located beneath the micromirror; and a progressive linkage connected to the micromirror to provide a non-linear restoring force in opposition to an electrostatic force provided by the electrostatic actuator. The progressive linkage further comprises a plurality of torsion bars which are interconnected, with at least two of the torsion bars being located at different heights above the substrate. The micromirror can include a mirror coating located on an upper surface thereof to provide an enhanced reflectivity for incident light. The progressive linkage in combination with the substrate can form a four-bar linkage with spring joints.

Each adjacent pair of the plurality of torsion bars can be connected together by a substantially rigid bar. Each torsion bar and each substantially rigid bar can also be formed of polycrystalline silicon.

The electrostatic actuator can comprise either a capacitive plate actuator or a vertical comb actuator. When a capacitive electrostatic actuator is used in the apparatus, the capacitive electrostatic actuator can comprise a fixed capacitive plate supported on the substrate and a moveable capacitive plate located on or below the light-reflective platform; and when a vertical comb actuator is used in the apparatus, the vertical comb actuator can comprise a plurality of moveable fingers suspended below the micromirror and a plurality of fixed fingers supported on the substrate. In response to an applied voltage, the moveable capacitive plate is urged towards the fixed capacitive plate to tilt the light-reflective platform. Similarly, in the vertical comb actuator, the moveable fingers are urged towards the fixed fingers by the applied voltage thereby tilting the micromirror which is connected to the moveable fingers.

The present invention further relates to a tiltable micromirror apparatus which comprises a silicon substrate; a light-reflective platform tiltably suspended above the silicon substrate by a plurality of interconnected torsion springs, with the plurality of interconnected torsion springs each further comprising a plurality of torsion bars with at least two of the torsion bars being located at different heights above the silicon substrate; and an electrostatic vertical comb actuator located beneath the light-reflective platform. The electrostatic vertical comb actuator further comprises a plurality of moveable electrostatic fingers attached to the light-reflected platform, and a plurality of fixed electrostatic fingers supported on the silicon substrate, with the moveable electrostatic fingers being moveable towards the fixed electrostatic fingers in response to a voltage applied therebetween to tilt the light-reflective platform. The plurality of interconnected torsion springs provides a non-linear spring constant in the apparatus.

Each adjacent pair of the plurality of torsion bars can be interconnected by a substantially rigid bar. A stop can be located below the light-reflective platform to limit a tilt angle of the light-reflective platform.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
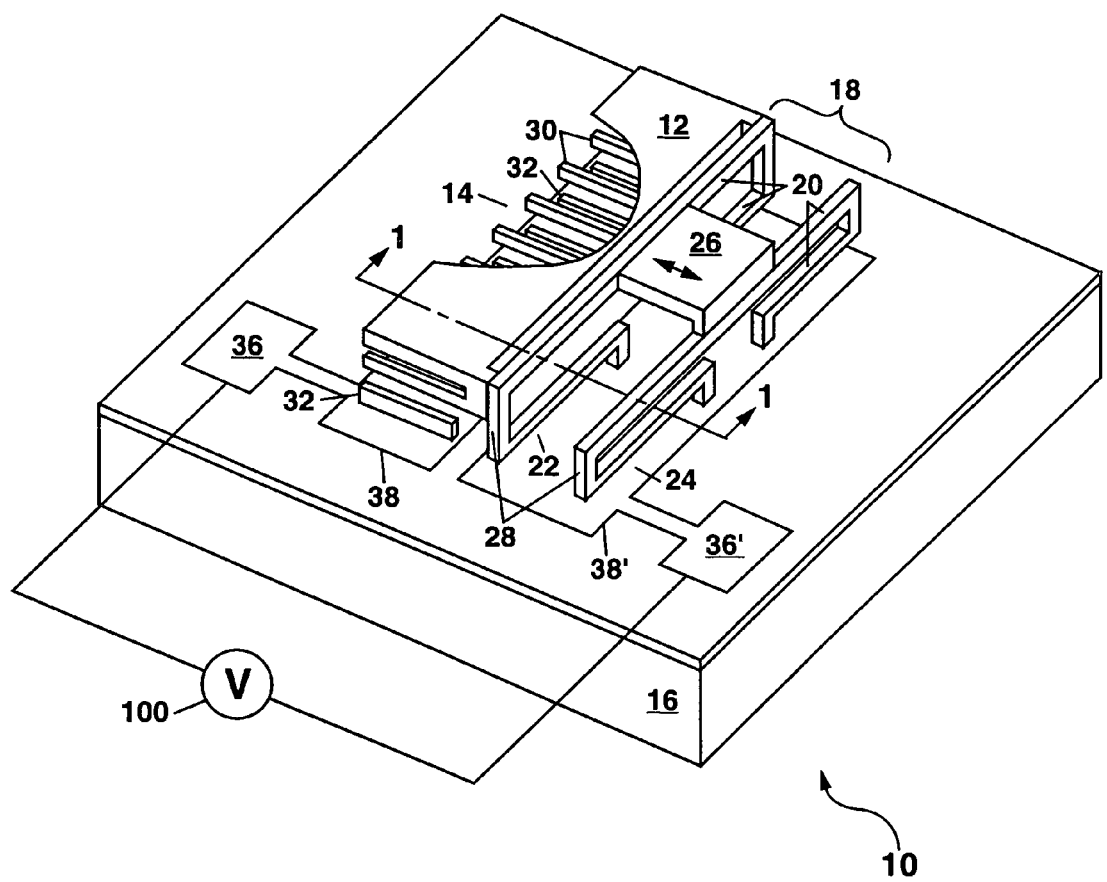
FIG. 1 shows in schematic perspective view a first example of a tiltable micromirror apparatus according to the present invention, with a portion of a light-reflective platform therein being removed to show details of an underlying electrostatic actuator.

Referring to FIG. 1, there is shown a tiltable micromirror apparatus 10 (also referred to herein as a tiltable micromirror 10). The tiltable micromirror 10 comprises a light-reflective platform 12 (also referred to herein as a micromirror 12) which has been partially cut away to show details of an underlying electrostatic actuator 14 which can be used to tilt the platform 12. The platform 12 is suspended above a substrate 16 by progressive linkage 18 which provides a non-linear restoring force which opposes any movement of the platform 12 and overcomes an electrostatic instability which would otherwise be present in the apparatus 10 if a linear torsion spring were to be used in place of the progressive linkage 18.

In the example of FIG. 1, the progressive linkage 18 comprises a plurality of torsion bars 20 (i.e. elongate horizontal members) which are oriented substantially parallel to the substrate 16 and connected together to form torsion springs 22 and 24. Each spring 22 and 24 can be constructed with a folded geometry as shown in FIG. 1 with both ends of each torsion spring 22 and 24 being anchored to the substrate 16. A connecting member 26 (also termed a bar) is attached near a midpoint of each torsion spring 22 and 24 in FIG. 1 to provide a substantially rigid connection between the springs 22 and 24 so that any movement of the progressive linkage 18 is limited to being along a single axis with one degree of freedom as indicated by the double-headed arrow in FIG. 1. The connecting member 26, which can be formed as a plate or truss, is suspended above the substrate 16 by the torsion springs 22 and 24, and can be L-shaped as shown in FIG. 1 when the two springs 22 and 24 have unequal heights (e.g. due to being formed from different layers of polycrystalline silicon in a multi-layer MEMS fabrication process).

In the example of FIG. 1, the light-reflective platform 12 can be attached to a pair of vertically-oriented substantially rigid bars 28 (i.e. substantially rigid members) which interconnect torsion bars 20 to form the torsion spring 22. In this way, the platform 12 and the substantially rigid bars 28 will tilt together.

Figure 2:
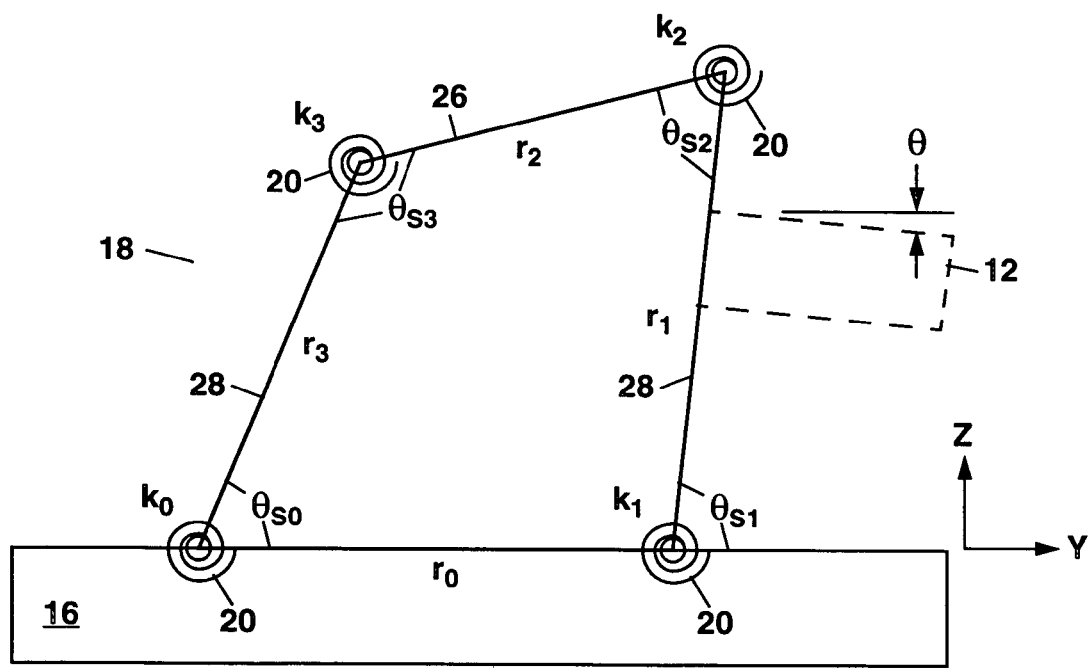
FIG. 2 shows an equivalent four-bar linkage with spring joints for analyzing the kinematic behavior of the device of FIG. 1.

In the example of FIG. 1, the progressive linkage 18 taken in combination with the substrate 16 can be modeled as an equivalent four-bar linkage with spring joints which are due to the presence of the torsion bars 20. Each spring joint provides a restoring force in the four-bar linkage. This is schematically illustrated in FIG. 2 for an arbitrary orientation with the torsion spring 22 being represented by springs $k_1$ and $k_2$ connected together by bar $r_1$, and with the torsion spring 24 being represented by springs $k_0$ and $k_3$ connected together by bar $r_3$. In the four-bar linkage, the substrate 16 (depicted as bar $r_0$) connects the springs $k_0$ and $k_1$ together; and the connecting member 26 (depicted as bar $r_2$) connects together springs $k_2$ and $k_3$. In FIG. 2, a dashed outline is shown to illustrate attachment of the light-reflective platform 12 to the bar $r_1$ (i.e. substantially rigid bar 28), with the platform 12 being tilted at an angle θ with respect to the Y axis. The four-bar linkage in FIG. 2 is restricted to move in a Y-Z plane with one degree of freedom.

The four-bar linkage in FIG. 2 can be kinematically analyzed to determine force and moment equations, and the relationship between the various tilt angles $\theta_{S0}$, $\theta_{S1}$, $\theta_{S2}$, and $\theta_{S3}$. Further details for this analysis, which is used to determine the torque output for the four-bar linkage with spring joints, can be found in an article by J. R. Bronson et al., entitled "Modeling and Alleviating Instability in a MEMS Vertical Comb Drive Using a Progressive Linkage" published in the *Proceedings of the ASME* 2005 *International Design Engineering Technical Conferences (IDETC) and Computers in Information (CIE) Conference*, Sep. 24-28, 2005, which is incorporated herein by reference. A predetermined value of torque output from the progressive linkage 18 can be determined from the above analysis and can be adjusted as needed by changing the lengths of bars $r_0$ and $r_2$ and/or the widths of the torsion bars 20. Generally, there will be less freedom in changing the thickness of the torsion bars 20 and the lengths of the bars $r_1$ and $r_3$ since these dimensions will be constrained by the available layer thicknesses and spacings in a MEMS process used to fabricate the tiltable micromirror apparatus 10.

Movement of the four-bar linkage with spring joints in FIG. 2 is integrally linked to the tilting of the light-reflective platform 12 which is attached to bar $r_1$ (i.e. bar 28 of the progressive linkage 18). This also can be seen from the schematic cross-section views of the apparatus in FIGS. 3A and 3B which show the platform 12 in an untilted and a tilted position, respectively.

Figure 3A:
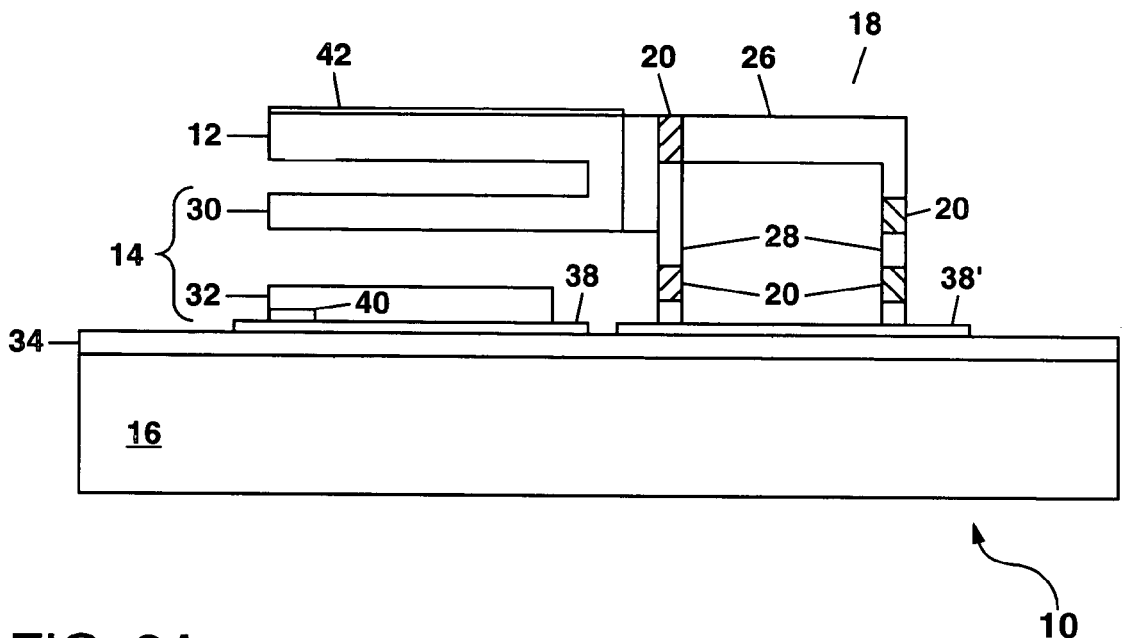
FIGS. 3A and 3B show schematic cross-section views of the device of FIG. 1 along the section line 1-1 to illustrate actuation of the device with an applied voltage to tilt the light-reflective platform therein from an untilted position as shown in FIG. 3A to a tilted position at an arbitrary angle θ as shown in FIG. 3B.

In FIG. 3A, the tiltable micromirror apparatus 10 is shown in a schematic cross-section view taken along the section line 1-1 in FIG. 1. This corresponds to an "as fabricated" position of the apparatus 10, and also to the position of the platform 12 in the absence of any voltage V applied to the electrostatic actuator 14. The light-reflective platform 12 is suspended parallel to the substrate 16 by being attached to the vertically-oriented substantially rigid bar 28 of the torsion spring 22. The platform 12 can be urged downward by an electrostatic force of attraction produced by the electrostatic actuator 14. The electrostatic actuator 14 can be either a capacitive plate electrostatic actuator (see FIGS. 6 and 7A, 7B), or a vertical comb actuator (also referred to as a vertical comb drive actuator) as shown in FIG. 1.

In the case of a vertical comb actuator 14, which is used for the example of FIG. 1, the vertical comb actuator 14 comprises a plurality of spaced-apart moveable fingers 30 (sometimes called a comb) which are supported beneath the platform 12 and extend outward substantially parallel to the platform 12. A plurality of fixed fingers 32 are supported on the substrate 16 below the moveable fingers 30. The fixed fingers 32 are generally spaced apart by the same distance as the moveable fingers 30 and are located halfway between the moveable fingers 30. This allows the moveable and fixed fingers 30 and 32 to be enmeshed together (i.e. interdigitated) as the moveable fingers 30 are urged downward in response to a voltage V from a voltage source 100 applied between the fingers 30 and 32.

The fixed fingers 32 can be electrically insulated from the substrate 16 by an electrically-insulating layer 34 (e.g. silicon nitride) and can be electrically connected to a contact pad 36 via an electrically-conductive region 38. The moveable fingers 30 can be electrically connected to another contact pad 36' via the torsion springs 22 and 24 and another electrically-conductive region 38' which generally serves as a ground plane and is connected to ground electrical voltage.

When the voltage V is applied to between the moveable and fixed fingers 30 and 32 of the vertical comb actuator 14, the generated electrostatic force of attraction between the fingers 30 and 32 will urge the moveable fingers 30 downwards thereby tilting the light-reflective platform 12. A stop 40 can be provided on the substrate 16 beneath the light-reflective platform 12 to limit the tilt angle θ and thereby prevent an electrical short circuit which might otherwise occur if the moveable fingers 30 were to come into contact with the fixed fingers 32 or the electrically-conductive region 38. The stop 40 can comprise, for example, a non-conducting layer (e.g. comprising silicon nitride).

Figure 3B:
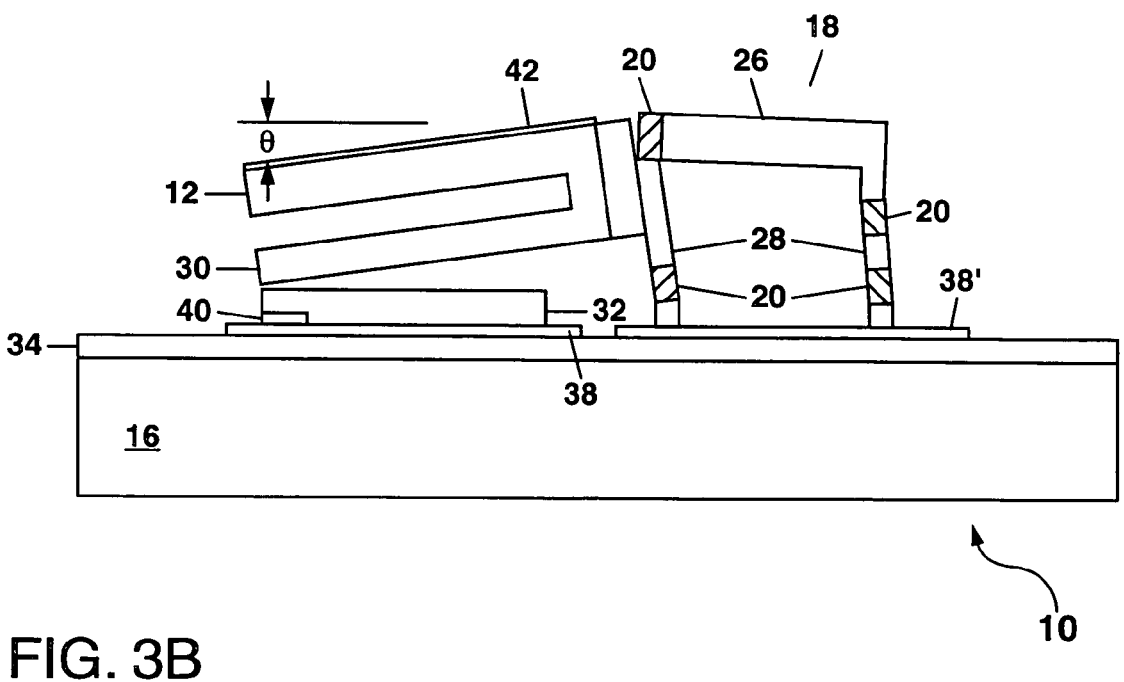

The exact angle of tilt θ in FIG. 3B will depend upon the magnitude of the applied voltage V and on a non-linear spring constant of the progressive linkage 18 which results from the torsion springs 22 and 24 being located at different distances from the light-reflective platform 12 and each having a plurality of interconnected torsion bars 20 therein. The non-linear spring constant of the progressive linkage 18 produces a non-linear restoring force which is in opposition to the electrostatic force of attraction produced by the vertical comb actuator 14 so that the tilt angle θ is determined by the point at which a mechanical torque $T_m$ produced by the non-linear restoring force exactly balances out an electrostatic torque $T_e$ produced by the electrostatic force of attraction.

Figure 4:
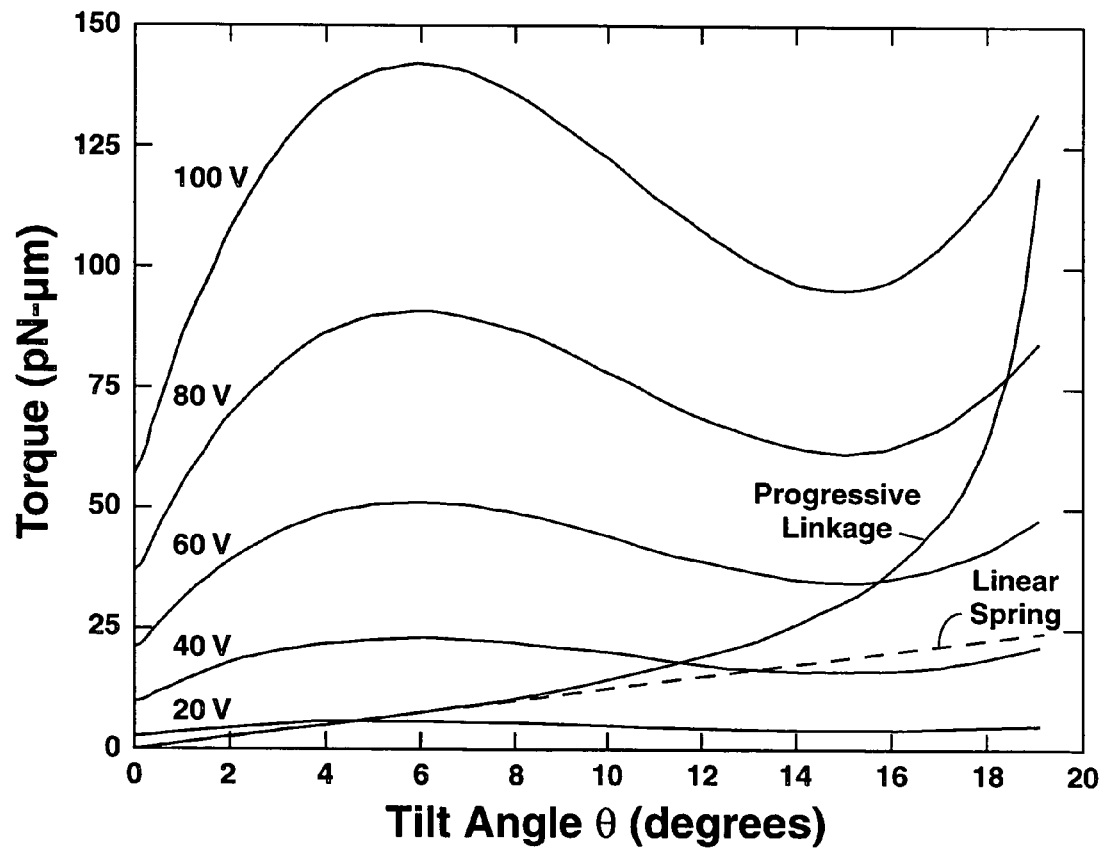
FIG. 4 shows calculated curves for the electrostatic torque $T_e$ produced by the vertical comb actuator and the mechanical torque $T_m$ produced by the progressive linkage in the device of FIG. 1. Also shown in FIG. 4 as a dashed line for comparison is a curve for the mechanical torque produced by a linear torsion spring.

FIG. 4 shows representative curves for the electrostatic torque $T_e$ produced by the vertical comb actuator 14 for a number of different values of the applied voltage V in the range of 20-100 Volts. These curves in FIG. 4 can be determined by first calculating a capacitance per unit cell for the vertical comb actuator 14 as a function of a tilt angle θ for the platform 12, and then fitting the calculated capacitance per unit cell to a fourth order polynomial function. A partial differential expression for the change in capacitance per unit cell with tilt angle θ (i.e. $\partial C/\partial \theta$) can then be determined and substituted into the following equation:

$$T_e = N \frac{1}{2} \frac{\partial C}{\partial \theta} V^2$$

to determine the electrostatic torque $T_e$ for each value of the applied voltage V. In the above equation C is the capacitance per unit cell which includes each moveable finger 30 and one-half of the two fixed fingers 32 on either side of that moveable finger 30, and N is the number of unit cells in the device 10 which is about one-half of the total number of fingers 30 and 32.

Curves for the electrostatic torque $T_e$ calculated in this way for applied voltages V=20, 40, 60, 80 and 100 Volts are shown in FIG. 4. The decrease in the electrostatic torque with increasing tilt angle θ for the electrostatic torque curves in FIG. 4 is due to a decrease in the change in capacitance with tilt angle θ as the free ends of the moveable fingers 30 start to become enmeshed with the fixed fingers 32.

Figure 7A:
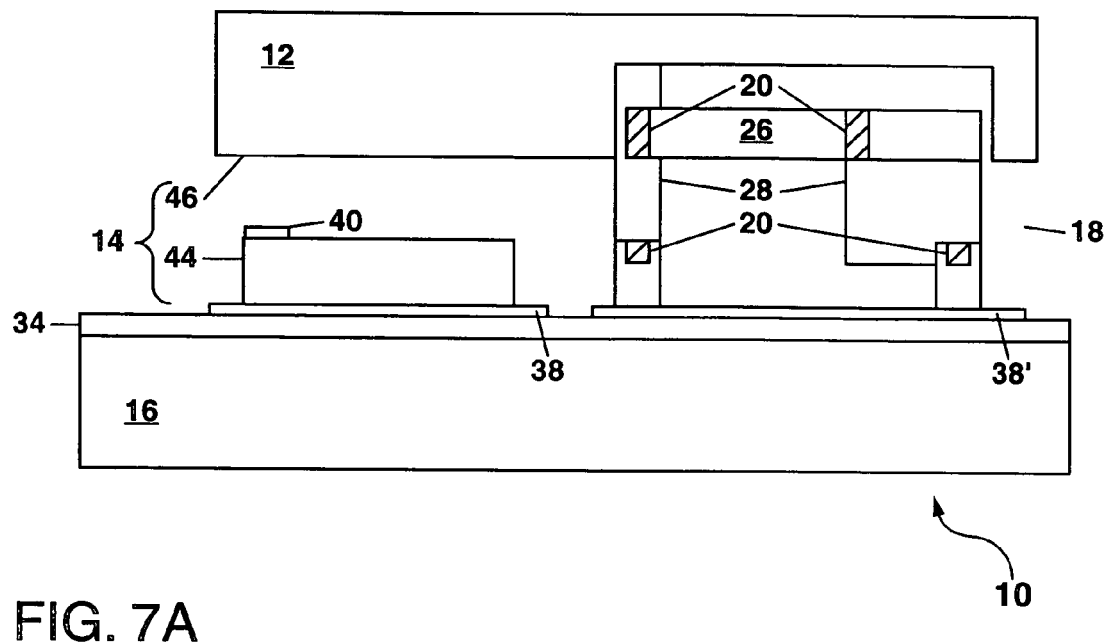
FIGS. 7A and 7B show schematic cross-section views of the device of FIG. 6 along the section line 2-2 to illustrate actuation of the device of FIG. 6 from an untilted position as shown in FIG. 7A to a tilted position at an arbitrary angle θ as shown in FIG. 7B.
Figure 7B:
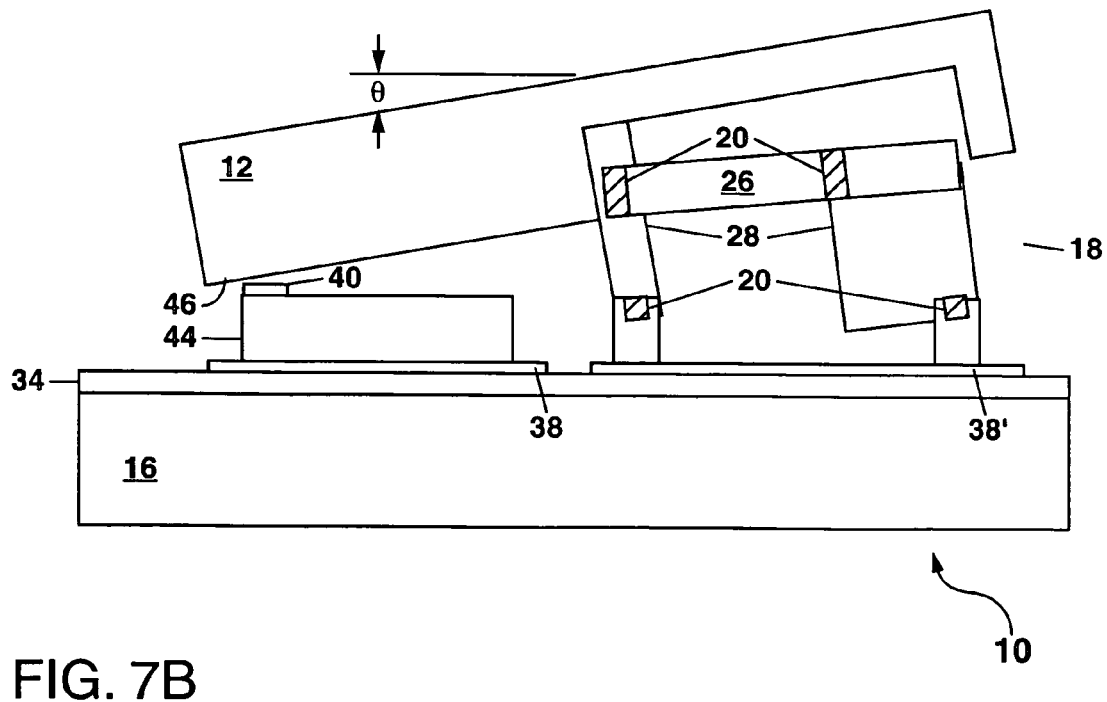

The analysis for a capacitive plate electrostatic actuator 14 is similar except that N is omitted from the above equation, and C represents an overall capacitance between a fixed capacitive plate 44 supported on the substrate 16 and a moveable capacitive plate 46 supported on the platform 12 (or an underside area of the platform 12 itself effectively forms the moveable capacitive plate 46 as shown in FIGS. 7A and 7B).

A knowledge of the electrostatic torque behavior of the vertical comb actuator 14 (or capacitive plate electrostatic actuator) can then be used to design a progressive linkage 18 which provides control over the tilt angle θ for any angle within the range of motion of the tiltable micromirror apparatus 10 so that a stable equilibrium can be maintained between the electrostatic torque $T_e$ of the electrostatic actuator 14 and the mechanical torque $T_m$ of the progressive linkage 18 for each value of the applied voltage V.

In the above analysis, flexing of the torsion bars 20 in the progressive linkage 18 has been neglected although it is expected that such flexing can be present and can contribute somewhat to the non-linear spring constant of the progressive linkage 18 depending upon the dimensions selected for each torsion bar 20. Such flexing is not necessarily disadvantageous to the operation of the tiltable micromirror apparatus 10 of the present invention.

Also shown in FIG. 4 is a dashed-line curve representing a conventional linear torsion spring, which has been used heretofore as the sole means for supporting a platform in conventional tiltable micromirrors. If a linear torsion spring were to be used in the tiltable micromirror 10 of the present invention in place of the progressive linkage 18, the mechanical torque $T_m$ of the linear torsion spring would be linearly related to the tilt angle θ according to the equation:

$$T_m = k_m \theta$$

where $k_m$ is the rotational spring constant. At some point during the tilting of the platform 12 in response to an applied voltage V when the electrostatic torque $T_e$ exceeds the mechanical torque $T_m$ of the linear spring, an equilibrium between these two opposing torques will no longer be maintained since the electrostatic torque $T_e$ will increase with tilt angle θ at a rate faster than the mechanical torque $T_m$. At this point, which occurs in FIG. 4 at an applied voltage V=46.7 Volts and a tilt angle of 16.5° where the electrostatic and mechanical torques are equal in magnitude and slope for the linear spring having a spring constant $k_m$=75.79 picoNewtons-µm/rad, the platform 12 will be abruptly pulled in to its fully actuated position at a tilt angle of 19° and will remain at this position with further increasing voltage V. Additionally, the device 10 with a linear torsion spring will exhibit hysteretic behavior as previously described until the applied voltage V is reduced below 46.7 Volts. This clearly shows the limitations of using a linear torsion spring in a tiltable micromirror.

The progressive linkage 18 of the present invention overcomes the problem of abrupt pull in and hysteretic behavior by providing a non-linear restoring torque as shown in FIG. 4. Since the mechanical torque $T_m$ of the progressive linkage 18 in FIG. 4 does not at any point run tangent to the curves of the electrostatic torque $T_e$ from the electrostatic actuator 14, the tiltable micromirror apparatus 10 with the progressive linkage 18 is not expected to exhibit any pull-in behavior and is therefore will also be free from any hysteretic behavior. The progressive linkage 18 therefore allows for improved control and reproducibility over the tilting of the platform 12 over a full range of motion from 0 to 19° which represents the extent of tilting for the device 10 in the example of FIGS. 1-4. The full control over the tilt angle θ provided by the progressive linkage 18 does, however, increase the voltage V required for actuation of the device 10 as can be seen from FIG. 4.

The exact shape of the non-linear torque curve for the progressive linkage 18 can be changed by varying the spacing on the substrate 16 between the torsion springs 22 and 24 (i.e. the length of bars $r_0$ and $r_2$ in FIG. 2) as previously described. This is advantageous since it allows the use of fixed dimensions to be used for the torsion springs 22 and 24 which can be important from a MEMS fabrication standpoint since MEMS fabrication processes have generally been standardized to include layers of fixed thicknesses (e.g. the five-level SUMMiT process developed by Sandia National Laboratories). For the progressive linkage 18 modeled above, the spacing between the torsion springs 22 and 24 was 10 µm.

The tiltable micromirror apparatus 10 of FIG. 1 can be fabricated using conventional surface micromachining processes which are well known in the art and which consist of depositing and patterning a plurality of alternating layers of polycrystalline silicon (also termed polysilicon) and a sacrificial material (e.g. silicon dioxide or a silicate glass such as TEOS which is deposited from the decomposition of tetraethylortho silicate by low-pressure chemical vapor deposition at about 750° C. and densified by a high temperature processing). Each polysilicon layer can be deposited by low-pressure chemical vapor deposition (LPCVD) at a temperature of about 580° C. and annealed, as needed, at a temperature of about 1100° C. for up to several hours to relieve any stress therein prior to photolithographically defining that layer. Each polysilicon layer can also be doped for electrical conductivity during. LPCVD deposition using boron or phosphorous as an impurity dopant.

The substrate 16, which can comprise silicon (e.g. a monocrystalline silicon wafer, or a portion thereof), can be initially prepared by forming a thermal oxide about 0.6 µm thick over the entire surface of the substrate 16. This can be done using a conventional wet oxidation process at an elevated temperature (e.g 1050° C. for about 1.5 hours). A layer of low-stress silicon nitride about 0.8 µm thick can then be blanket deposited over the thermal oxide layer by LPCVD at about 850° C. The thermal oxide and silicon nitride layers together form the electrically-insulating layer 34 shown in FIGS. 3A and 3B.

A first polysilicon layer (termed Poly-0) about 0.3 µm thick can be deposited over the substrate 16 by LPCVD and patterned to form the contact pads 36 and 36' and also the electrically-conductive regions 38 and 38'. The term "patterning" as used herein refers to a sequence of well-known semiconductor integrated circuit processing steps including applying a photoresist to the substrate 16, prebaking the photoresist, aligning the substrate 16 with a photomask, exposing the photoresist through the photomask, developing the photoresist, baking the photoresist, etching away the surfaces not protected by the photoresist, and stripping the protected areas of the photoresist so that further processing can take place.

A second polysilicon layer (termed Poly-1) can be deposited over the substrate 16 after first depositing a 2 µm-thick layer of the sacrificial material. Each layer of the sacrificial material can be planarized, as needed, using chemical-mechanical polishing, and can optionally be etched (e.g. using reactive ion etching) to form recesses partially or completely through the layer of the sacrificial material wherein portions of a subsequent layer of polysilicon can be deposited. The Poly-1 layer, which is 1-μm thick, can be used to begin to build up the structure of the apparatus 10, including the torsion bars 20 nearest the substrate 16 in FIG. 1. These torsion bars 20, which form the joints $k_0$ and $k_1$ in FIG. 2 and which were used for the calculated curves in FIG. 4, can each be 1.5 μm wide, 1 μm thick and 30 μm long. The ends of each torsion spring 22 and 24 can be anchored to the substrate 16 using the Poly-1 layer which is deposited into recesses formed through the underlying sacrificial material. Additionally, the Poly-1 layer can be used to build up the fixed fingers 32 of the vertical comb actuator 14.

A third polysilicon layer (termed Poly-2) about 1.5 μm thick can be used to further build up the torsion springs 22 and 24 and the fixed fingers 32 of the vertical comb actuator 14. The Poly-2 layer can be separated from the Poly-1 layer by about 0.3 μm of sacrificial material which can be etched away in regions where the Poly-2 layer is to be connected directly to the Poly-1 layer using recesses formed through this sacrificial material layer. In the example of FIG. 1, twenty five fixed fingers 32 can be used, with each finger being 47 μm long and 2 μm wide.

A fourth polysilicon layer (termed Poly-3) about 2.25 μm thick is blanket deposited above a 2-μm thick layer of the sacrificial material and patterned to form the moveable fingers 30 of the vertical comb actuator 14 which can have the same width as the fixed fingers 32. A total of 24 or 26 moveable fingers 30 can be provided in the tiltable micromirror apparatus 10 of FIG. 1, depending on how the fingers 30 and 32 are arranged. The Poly-3 layer can also be used to form the upper torsion bars 20 of the torsion spring 24 which can have dimensions of 1.5 μm width, 2.25 μm height and 30 μm length. The Poly-2 and Poly-3 layers can also be interconnected to form the substantially rigid bars 28 of the torsion spring 22, with the Poly-2 layer alone forming the bars 28 of the torsion spring 24 in the example of FIG. 1. Each substantially rigid bar 28 can have lateral dimensions of 3 μm×3 μm. The Poly-3 layer can also be used to begin to build up the connecting member 26.

A fifth polysilicon layer (termed Poly-4) about 2.25 μm thick can be formed over another 2-μm thick layer of the sacrificial material to complete the build-up of the device 10 in the example of FIG. 1. The Poly-4 layer forms the light-reflective platform 12, which can have lateral dimensions of 45 μm×152 μm, and also the connecting member 26, which can have lateral dimensions of 48 μm wide×14.5 μm long. The Poly-4 layer can also form the upper torsion bars 20 of the torsion spring 22 which can have dimensions of 1.5 μm width, 2.25 μm height and 30 μm length.

After build-up of the structure of the tiltable micromirror apparatus 10 in FIG. 1, a final layer of the sacrificial material can be used to completely encapsulate the device 10 in preparation for a final annealing step to relieve any stress therein. The various layers of the sacrificial material can then be removed to free up the device 10 for movement. This can be done by immersing the substrate 16 into a selective wet etchant comprising hydrofluoric acid for several hours or overnight. After this etching step, the substrate 16 can be dried.

An optional mirror coating 42 can be deposited over an upper surface of the light-reflective platform 12 to enhance the reflectivity for incident light. This can be done by evaporating or sputtering about 0.2 μm of a reflective metal such as aluminum, silver or gold through a shadow mask.

Figure 5:
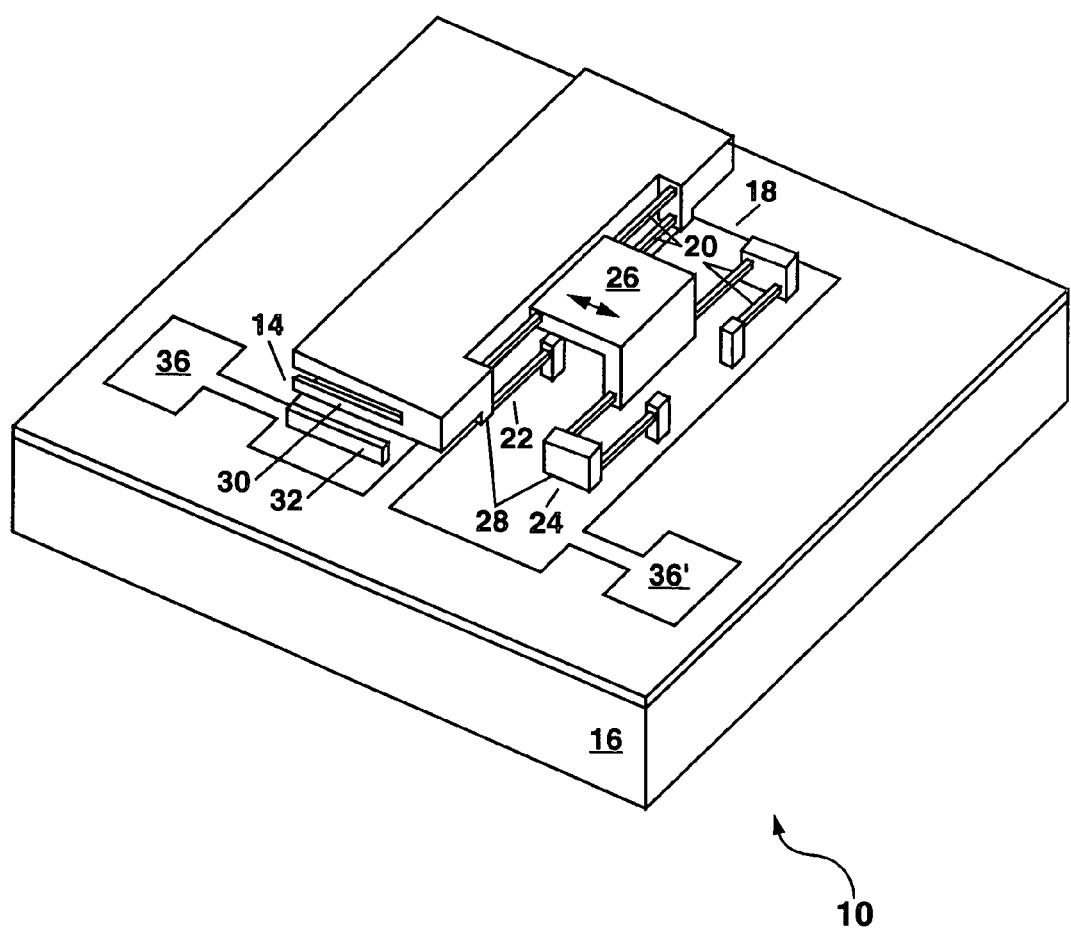
FIG. 5 shows a schematic perspective view of a second example of the tiltable micromirror apparatus of the present invention.

FIG. 5 schematically illustrates a second example of the tiltable micromirror apparatus 10 of the present invention.

The operation of the device 10 in FIG. 5 is similar to that of FIG. 1 which was previously described with reference to FIGS. 2-4.

In the apparatus 10 of FIG. 5, the torsion spring 24 can be formed with the upper torsion bar 20 being fabricated from the Poly-2 layer rather than being fabricated from the Poly-3 layer as in the example of FIG. 1. This can reduce the thickness of this torsion bar 20 from 2.25 μm to 1.5 μm to make this torsion bar more compliant. Additionally, the substantially rigid bars 28 can be used to laterally offset the upper and lower torsion bars 20 as shown in FIG. 5. This can allow a larger separation between the upper and lower torsion bars 20 than would generally be possible for the example of FIG. 1. The substantially rigid bars 28 in the torsion spring 24 in FIG. 5 can be, for example, 11.5 μm long, 3 μm wide and 7 μm high, and can be formed from the Poly-1 through Poly-3 layers.

In the example of FIG. 5, the substantially rigid bars 28 for the torsion spring 22 can be formed integrally with the light-reflective platform 12 using the Poly-1 through Poly-4 layers. The connecting member 26 in this example of the present invention can be formed with a vertical portion comprising the Poly-2 through Poly-4 layers that is connected to the torsion spring 24, and with a horizontal portion comprising the Poly-3 and Poly-4 layers that is connected to the torsion spring 22.

Figure 6:
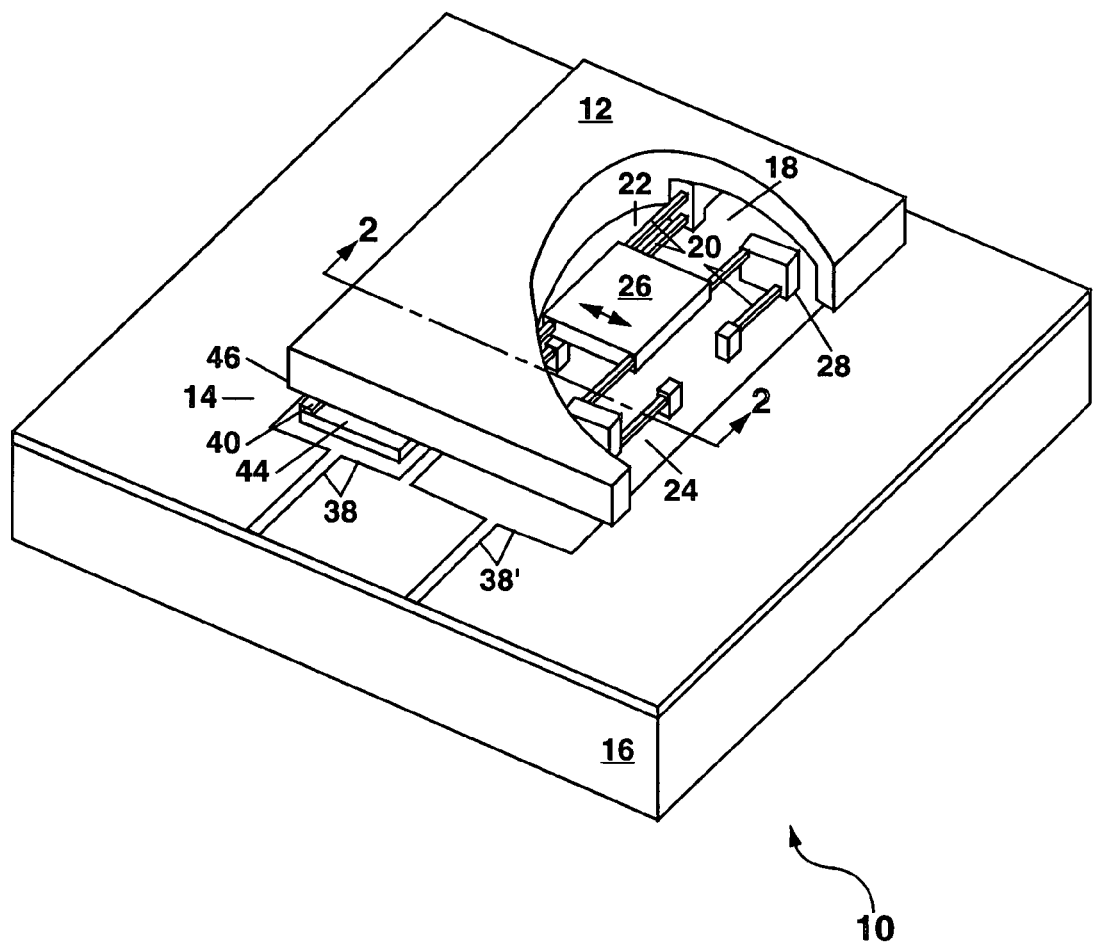
FIG. 6 shows a schematic perspective view of a third example of the tiltable micromirror apparatus of the present invention with a portion of the light-reflective platform being removed to show details of an underlying progressive linkage.

FIG. 6 schematically illustrates a third example of the tiltable micromirror apparatus 10 of the present invention in a schematic perspective view with a portion of the light-reflective platform 12 being removed to show details of the underlying progressive linkage 18. In this example of the present invention, the platform 12 extends over the progressive linkage 18. This is advantageous to allow a one-dimensional (1D) or two-dimensional (2-D) array 50 of micromirrors 10 to be formed on a common substrate 16 with a relatively high fill factor (see FIG. 8).

In the example of FIG. 6, the electrostatic actuator 14 comprises a capacitive plate actuator having a fixed capacitive plate 44 supported on the substrate 16 and a moveable capacitive plate 46 which is formed by a lower surface of the platform 12 itself. This is schematically illustrated in the schematic cross-section views of FIGS. 7A and 7B which are taken along the section line 2-2 in FIG. 6. In other embodiments of the present invention, the moveable capacitive plate 44 can be formed underneath the platform 12 as a cantilevered layer similar to the Poly-3 layer which is used to form the moveable fingers 30 in the example of FIG. 1.

In FIG. 7A, the tiltable micromirror apparatus 10 of FIG. 6 is shown in an "as fabricated" position without any applied voltage V. In response to an applied voltage V, the moveable capacitive plate 44 is electrostatically urged towards the fixed capacitive plate 44 thereby tilting the light-reflective platform 12 at an angle θ as shown in FIG. 7B. A stop 42 can be provided to extend above the fixed capacitive plate 44 to prevent any possibility for short circuiting of the fixed and moveable capacitive plates 44 and 46. The stop 42 can comprise, for example, a layer of silicon nitride having a layer thickness of 1 μm or less.

In this third example of the present invention, the platform can be formed form the Poly-3 and Poly-4 layers, with the Poly-3 layer being omitted surrounding the location wherein the progressive linkage 18 is to be formed. This allows the 2.25 μm thick Poly-3 layer to be used to form the connecting member 26 as a plate with lateral dimensions of, for example, 48 μm wide×14.5 μm long. The light-reflective platform 12 can be, for example, 0.1-1 millimeters on a side.

The torsion springs 22 and 24 in the example of FIG. 6 each have an upper torsion bar 20 formed in the Poly-3 layer with dimensions of 1.5 μm wide×2.25 μm thick×30 μm long, and a lower torsion bar 20 formed in the Poly-1 layer with the same length and width and with a thickness of 1 μm. In the torsion spring 24, the substantially rigid bars 28 can be formed by stacking and interconnecting together the Poly-1 through Poly-3 layers.

The fixed capacitive plate 44 can be formed from the Poly-1 layer, with the electrically-conductive regions 38 and 38' being formed from the Poly-0 layer. The electrically-conductive regions 38 and 38' can also be used to form wiring for electrically addressing the tiltable micromirror 10, and/or for connecting the tiltable micromirror 10 to electronic circuitry which can be formed on the substrate 16 (e.g. as complementary metal-oxide semiconductor circuitry also referred to as CMOS).

Figure 8:
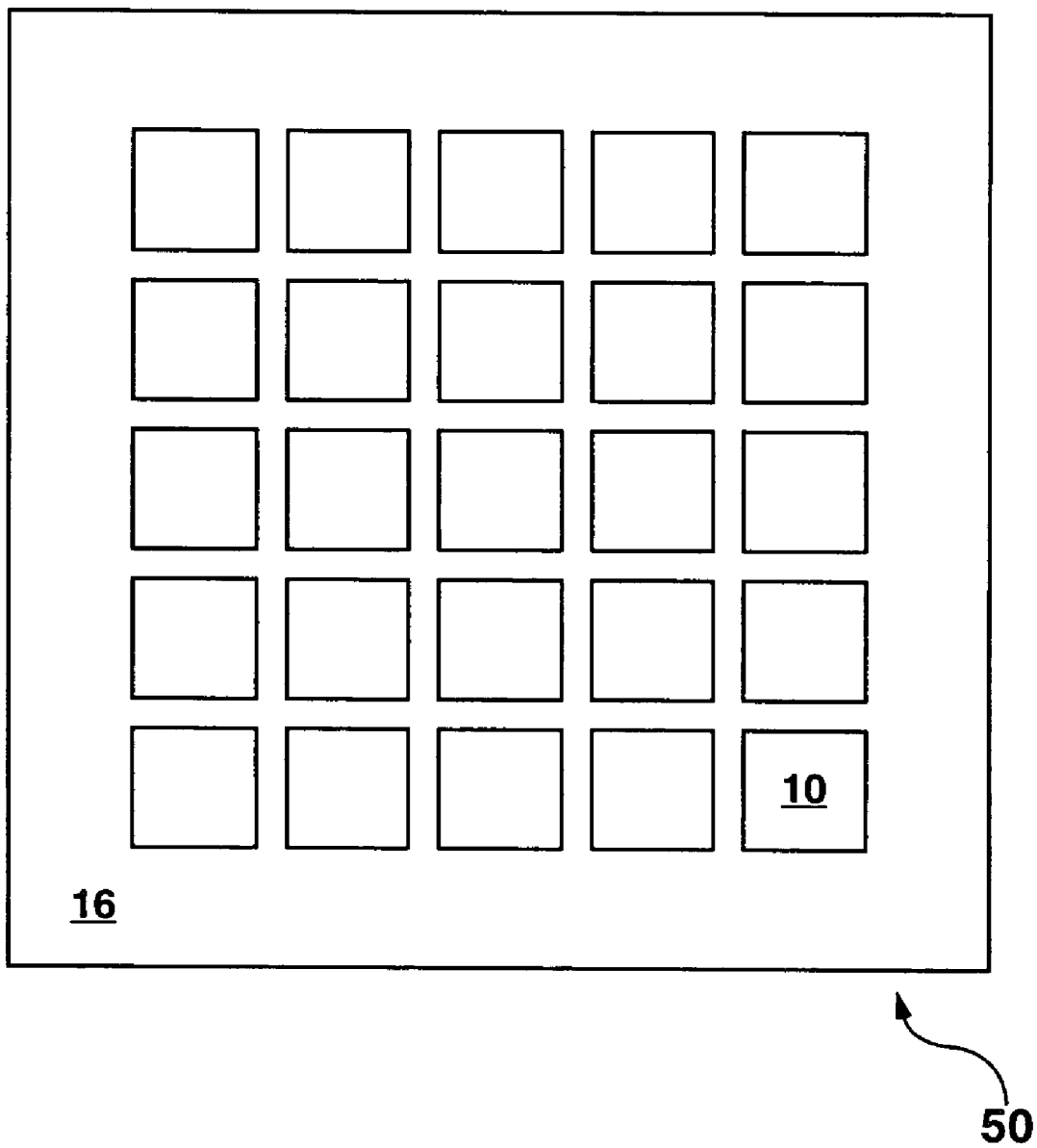
FIG. 8 schematically illustrates in plan view a two-dimensional (2-D) array of tiltable micromirrors formed on a common substrate.

A 1-D or 2-D array 50 of tiltable micromirrors 10 can also be formed according to the present invention as schematically illustrated in plan view in FIG. 8. Row and column addressing can be used to individually address and electrically activate each tiltable micromirror 10 in the tiltable micromirror array 50. Alternately, electrically-conductive vias can be formed through the substrate 16 beneath each tiltable micromirror 10 to allow for electrical connections to be made to each tiltable micromirror 10 from a backside of the substrate 16.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A tiltable micromirror apparatus, comprising:
   a substrate;
   a light-reflective platform tiltably suspended above the substrate by a first torsion spring which is attached to both the platform and the substrate;
   a second torsion spring located alongside of the first torsion spring and connected thereto by a connecting member which is suspended above the substrate by the first and second torsion springs, with the second torsion spring further being attached to the substrate at two opposite ends of the second torsion spring; and
   an electrostatic actuator located below the light-reflective platform and operatively connected to tilt the light-reflective platform in response to an applied voltage, with the first and second torsion springs in combination providing a non-linear restoring force in opposition to tilting of the light-reflective platform by the electrostatic actuator.

2. The apparatus of claim 1 wherein the first and second torsion springs each comprise a plurality of elongate horizontal members located above the substrate and substantially parallel thereto.

3. The apparatus of claim 1 wherein the first and second torsion springs in combination with the connecting member and the substrate forms a four-bar linkage with spring joints.

4. The apparatus of claim 1 wherein each end of the first torsion spring is attached to the substrate, with one end of the connecting member being attached near a midpoint of the first torsion spring.

5. The apparatus of claim 4 wherein the other end of the connecting member is attached near a midpoint of the second torsion spring.

6. The apparatus of claim 1 wherein the electrostatic actuator comprises a capacitive plate actuator having a fixed capacitive plate supported on the substrate and a moveable capacitive plate located on or below the light-reflective platform, with the moveable capacitive plate in response to the applied voltage being urged towards the fixed capacitive plate to tilt the light-reflective platform.

7. The apparatus of claim 1 wherein the electrostatic actuator comprises a vertical comb actuator which further comprises a plurality of moveable fingers suspended below the light-reflective platform and a plurality of fixed fingers supported on the substrate, with the moveable fingers in response to the applied voltage being urged towards the fixed fingers to tilt the light-reflective platform.

8. The apparatus of claim 1 wherein the light-reflective platform further comprises a mirror coating located on an upper surface thereof.

9. The apparatus of claim 1 further comprising a stop located below the light-reflective platform to limit an angle of tilt of the light-reflective platform.

10. The apparatus of claim 1 wherein each torsion spring comprises a plurality of layers of polycrystalline silicon which are stacked up and interconnected.

11. A tiltable micromirror apparatus, comprising:
    a substrate;
    a micromirror suspended above the substrate and tiltable at an angle to the substrate by an electrostatic actuator located beneath the micromirror; and
    a progressive linkage connected to the micromirror to provide a non-linear restoring force in opposition to an electrostatic force provided by the electrostatic actuator, with the progressive linkage further comprising a plurality of torsion bars which are all located on one side of the micromirror and interconnected by a plurality of substantially rigid bars, and with at least two of the torsion bars being located at different heights above the substrate.

12. The apparatus of claim 11 wherein each adjacent pair of the plurality of torsion bars is connected together by one of the substantially rigid bars.

13. The apparatus of claim 12 wherein each torsion bar and each substantially rigid bar comprises polycrystalline silicon.

14. The apparatus of claim 11 wherein the progressive linkage in combination with the substrate forms a four-bar linkage with spring joints.

15. The apparatus of claim 11 wherein the micromirror further comprises a mirror coating located on an upper surface thereof.

16. The apparatus of claim 11 wherein the electrostatic actuator comprises a capacitive plate actuator having a fixed capacitive plate supported on the substrate and a moveable capacitive plate located on or below the light-reflective platform, with the moveable capacitive plate in response to an applied voltage being urged towards the fixed capacitive plate to tilt the light-reflective platform.

17. The apparatus of claim 11 wherein the electrostatic actuator comprises a vertical comb actuator which further comprises a plurality of moveable fingers suspended below the micromirror and a plurality of fixed fingers supported on the substrate, with the moveable fingers in response to an applied voltage being urged towards the fixed fingers thereby tilting the micromirror.

18. A tiltable micromirror apparatus, comprising:
    a silicon substrate;
    a light-reflective platform tiltably suspended above the silicon substrate by a plurality of interconnected torsion springs to provide a non-linear spring constant, with each torsion spring comprising a plurality of torsion bars oriented substantially parallel to the silicon substrate, and with at least two of the torsion bars being located at different heights above the silicon substrate; and an electrostatic vertical comb actuator located under the light-reflective platform, with the electrostatic vertical comb actuator further comprising a plurality of moveable electrostatic fingers suspended under the light-reflective platform, and a plurality of fixed electrostatic fingers supported on the silicon substrate, with the moveable electrostatic fingers being moveable towards the fixed electrostatic fingers in response to a voltage applied therebetween to tilt the light-reflective platform.

19. The apparatus of claim 18 wherein each adjacent pair of the plurality of torsion bars are interconnected by a substantially rigid bar.

20. The apparatus of claim 18 further comprising a stop located below the light-reflective platform to limit a tilt angle of the light-reflective platform.

* * * * *